(12) United States Patent
Kadowaki et al.

(10) Patent No.: US 8,795,397 B2
(45) Date of Patent: Aug. 5, 2014

(54) REFORMING DEVICE WITH SERIES-CONNECTED GAS-LIQUID MULTIPHASE AND DRY-OUT HEAT EXCHANGERS

(75) Inventors: Masataka Kadowaki, Yokohama (JP); Takuya Kajita, Yokohama (JP); Yoshinobu Nishimura, Yokohama (JP); Yasushi Sato, Yokohama (JP); Ken Samura, Yokohama (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 449 days.

(21) Appl. No.: 12/934,548

(22) PCT Filed: Mar. 6, 2009

(86) PCT No.: PCT/JP2009/001015
§ 371 (c)(1),
(2), (4) Date: Sep. 24, 2010

(87) PCT Pub. No.: WO2009/119014
PCT Pub. Date: Oct. 1, 2009

(65) Prior Publication Data
US 2011/0067303 A1    Mar. 24, 2011

(30) Foreign Application Priority Data
Mar. 24, 2008    (JP) ................... 2008-076827

(51) Int. Cl.
*B01J 7/00*    (2006.01)
(52) U.S. Cl.
USPC .............................................. 48/61
(58) Field of Classification Search
None
See application file for complete search history.

(56) References Cited

U.S. PATENT DOCUMENTS

| 4,350,133 | A | * | 9/1982 | Greiner | 123/550 |
| 4,573,435 | A | * | 3/1986 | Shelton | 123/3 |
| 5,066,421 | A | * | 11/1991 | Giacobbe | 252/373 |
| 2001/0049906 | A1 | * | 12/2001 | Shimazu | 48/76 |
| 2002/0131921 | A1 | | 9/2002 | Ishikawa | |
| 2008/0050624 | A1 | * | 2/2008 | Barbier et al. | 429/20 |

FOREIGN PATENT DOCUMENTS

| JP | 2002-187703 | 7/2002 |
| JP | 2002-241108 | 8/2002 |
| JP | 2002-276926 | 9/2002 |
| JP | 2002-326802 | 11/2002 |
| JP | 2003-068346 | 3/2003 |
| JP | 2004-115320 | 4/2004 |

OTHER PUBLICATIONS

International Search Report, with English Translation, issued in International Patent Application No. PCT/JP2009/001015, mailed Apr. 21, 2009. International Preliminary Examination Report on Patentability, with English Translation, issued in International Application No. PCT/JP2009/001015, issued on Sep. 28, 2010.

* cited by examiner

*Primary Examiner* — Imran Akram
(74) *Attorney, Agent, or Firm* — McDermott Will & Emery LLP

(57) ABSTRACT

A reforming apparatus for reforming a raw fuel into a hydrogen-rich reformed gas includes a reformer for generating the reformed gas from the raw fuel, and a steam supply means for supplying the steam to the reformer. The steam supply means has a dry-out heat exchanger that dries out the water by conducting heat exchange with the reformed gas generated when the raw fuel is combusted. The cross-sectional area of passage in the dry-out heat exchanger is larger than that of a pipe connected upstream of the dry-out heat exchanger.

4 Claims, 5 Drawing Sheets

REFORMING DEVICE WITH SERIES-CONNECTED GAS-LIQUID MULTIPHASE AND DRY-OUT HEAT EXCHANGERS

CROSS-REFERENCE TO RELATED APPLICATIONS

This application is based upon International Application No. PCT/JP2009/001015, filed Mar. 6, 2009 and claims the benefit of priority from the prior Japanese Patent Application No. 2008-076827, filed Mar. 24, 2008, the entire contents of which are incorporated herein by reference.

BACKGROUND OF THE INVENTION

1. Field of the Invention

The present invention relates to a reforming apparatus, for use in a fuel cell, which reforms raw fuel into a reformed gas used in a fuel cell system.

2. Description of the Related Art

A polymer electrolyte fuel cell produces electric power by converting chemical energy of hydrogen into electric energy. For practical purposes, the hydrogen used as a fuel for the polymer electrolyte fuel cell is obtained in a manner that a hydrocarbon-based gas, such as natural gas or naphtha relatively easily procurable at a relatively low cost, or a raw fuel gas of an alcohol type, such as methanol, and steam are mixed together and then reformed by a reformer. The hydrogen gas obtained by the reforming is supplied to a fuel electrode of the fuel cell and used to generate electricity.

Generally, steam required for the reforming in the reformer can be obtained by conducting heat exchange between a combustion exhaust gas and a fuel gas discharged from the reformer. However, when water of low temperature is rapidly heated by conducting heat exchange, there are cases where the flow rate of steam varies significantly due to the pulsating movement of partially boiled water. Such a state causes the mixture ratio of steam and raw fuel gas (steam-carbon ratio (S/C ratio)) to vary, which hinders the stabilized generation of hydrogen gas in the reformer and consequently contributes to the hindrance of the stabilized supply of hydrogen gas to a fuel cell stack.

In order to suppress the variation in the flow rate of steam caused by the water boiling, a fuel reforming apparatus is designed such that a means for narrowing down the feed water is provided between a carbon monoxide remover and a steam generator in a feed-water heating line through which the feed-water is introduced into the steam generator (See Patent Document 1, for instance)

[Patent Document 1] Japanese Unexamined Patent Publication No. 2002-241108.

SUMMARY OF THE INVENTION

The present invention has been made under such circumstances, and a purpose thereof is to provide a reforming apparatus in which steam is stably supplied to a reformer.

In order to resolve the above problems, a reforming apparatus according to an embodiment of the present invention reforms a raw fuel into a hydrogen-rich reformed gas, and it comprises a reformer configured to generate the reformed gas from the raw fuel; and a steam supply means configured to supply steam to the reformer. The steam supply means includes a dry-out heat exchanger that dries out water by conducting heat exchange with at least one of a combustion exhaust gas, generated when the reformer is heated, and the reformed gas. A passage in the dry-out heat exchanger has a cross-sectional area larger than that of a pipe connected upstream of the dry-out heat exchanger.

By employing this embodiment, the passage in the dry-out heat exchanger has a cross-sectional area larger than that of a pipe connected upstream thereof. Thus, the occurrence of slug flow in the dry-out heat exchanger is suppressed and at the same time the pressure fluctuation is suppressed.

The steam supply means may further include a gas-liquid multiphase heat exchanger for raising an evaporation rate of water up to a condition of gas-liquid multiphase by conducting heat exchange, the gas-liquid multiphase heat exchanger being disposed upstream of the dry-out heat exchanger. This suppresses the abrupt occurrence of steam in the dry-out heat exchanger, which in turns suppresses the pressure fluctuation.

The steam supply means may have an upstream-side narrow-down mechanism located between a water supply means for supplying water by pressure toward the gas-liquid multiphase heat exchanger and the gas-liquid multiphase heat exchanger, the upstream-side narrow-down mechanism having a diameter smaller than that of passage in the gas-liquid multiphase heat exchanger. As a result, an adverse effect of the pressure fluctuation on the water supply means is suppressed in the event that a pressure fluctuates due to vaporization of water in the dry-out heat exchanger and the gas-liquid multiphase heat exchanger.

The reforming apparatus may be configured such that no nucleate boiling of water by heat exchange occurs in an upstream side of the upstream-side narrow-down mechanism. The upstream-side narrow-down mechanism prevents the occurrence of nucleate water boiling on a water supply means side, thereby preventing the supply pressure in the water supply means from being unstable. As a result, steam can be stably generated and consequently the reformed gas can be stably generated.

The steam supply means may have a downstream-side narrow-down mechanism located between a raw fuel supply passage, for supplying a raw fuel to the reformer, which is disposed downstream of the dry-out heat exchanger, and the dry-out heat exchanger, the downstream-side narrow-down mechanism having a diameter smaller than that of a passage of the dry-out heat exchanger. Thus, even if a bumping occurs in the dry-out heat exchanger, an adverse effect of the pressure fluctuation caused thereby on the raw-fuel pressure in a downstream-side raw fuel passage is suppressed. As a result, the raw fuel can be stably supplied and the reformed gas can be stably generated.

The reforming apparatus may further comprise a foreign-matter capturing means configured to prevent a foreign matter from flowing into a downstream side, the foreign-matter capturing means being disposed between the dry-out heat exchanger and the downstream-side narrow-down mechanism. This prevents the foreign matter contained in water from being clogged up in the downstream-side narrow-down mechanism, so that steam can be stably supplied to the reformer.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
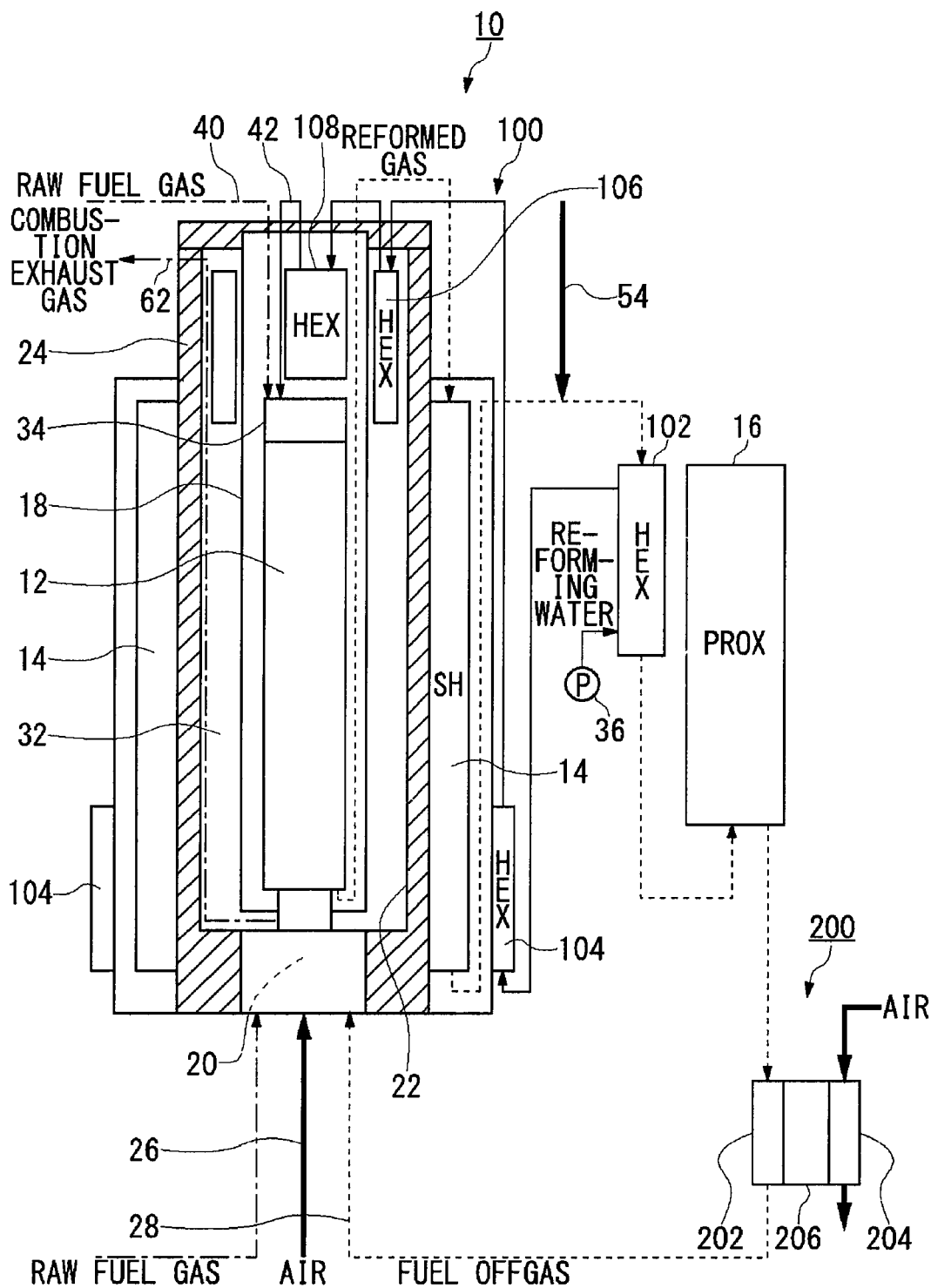
FIG. 1 is a cross-sectional view illustrating a structure of a reforming apparatus, for use in a fuel cell, according to an embodiment of the present invention.

The best modes of carrying out the present invention will now be described in detail with reference to drawings. Note that in all of the Figures the same components are given the same reference numerals and the repeated description thereof is omitted as appropriate.

Figure 2:
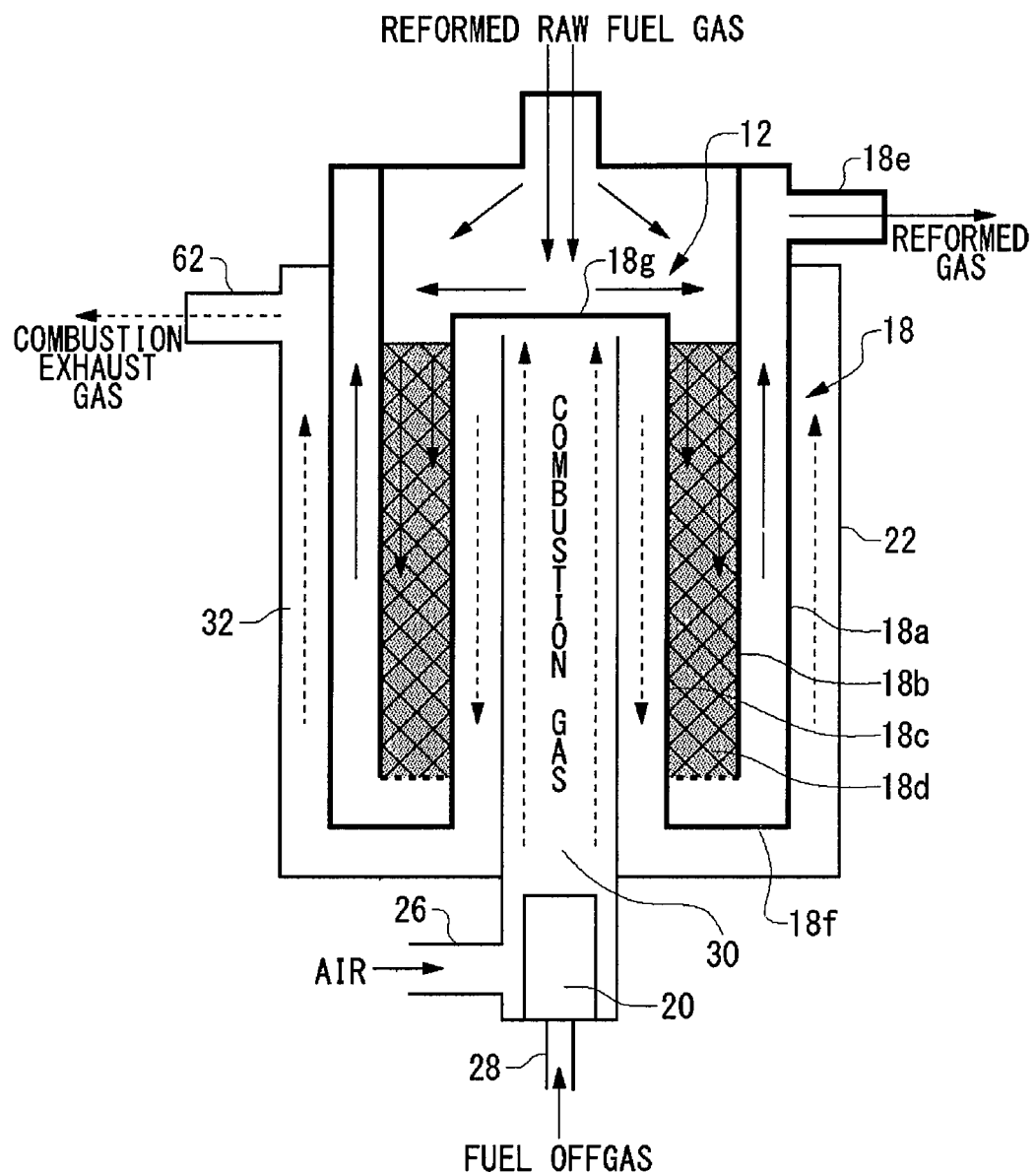
FIG. 2 is an enlarged cross-sectional view showing a vicinity of a reformer shown in FIG. 1.

FIG. 1 is a cross-sectional view illustrating a structure of a reforming apparatus 10, for use in a fuel cell, according to an embodiment of the present invention. FIG. 2 is an enlarged cross-sectional view showing a vicinity of a reformer shown in FIG. 1. Heat exchangers 106 and 108, discussed later, are omitted in FIG. 2. The fuel cell reforming apparatus 10 produces hydrogen-rich reformed gas by subjecting methane, propane, butane or the like, which is a raw fuel, to steam reforming.

The fuel cell reforming apparatus 10 includes a reformer 12 for producing the reformed gas from the raw fuel, a shift reactor 14 for reducing the carbon monoxide contained in the reformed gas through a shift reaction, a preferential oxidation unit 16 for reducing the carbon monoxide contained in the reformed gas which has passed through the shift reactor 14 by performing preferential oxidation on said carbon monoxide through a preferential oxidation reaction, a reforming reaction tube 18 for housing the reformer 12, a burner 20, as a combustion means, for generating a combustion exhaust gas by combusting a combustion offgas, which has not been consumed in a fuel electrode of the fuel cell, an outer casing 22, disposed coaxially around the reforming reaction tube 18, having a larger diameter than that of the reforming reaction tube 18. The periphery of the outer casing 22 is covered with a heat insulating material 24 except for portions where a plurality of pipings communicate with the exterior.

Next, a structure of a vicinity of the reformer is described with reference to FIG. 2. The reforming reaction tube 18 has a reforming outer tube 18a, a catalyst outer tube 18b and a reforming inner tube 18c, which are disposed concentrically in this order from the exterior to the interior. Also, an annular catalyst layer 18d is provided in an area between the catalyst outer tube 18b and the reforming inner tube 18c. The catalyst layer 18d contains a reforming catalyst where metal particles such as nickel or ruthenium are supported on alumina.

An exhaust outlet 18e is provided on the top of the reforming outer tube 18a. The reforming outer tube 18a and the reforming inner tube 18c are coupled to each other using a lower plate member 18f whose lower part is ring-shaped, and a gap or space is provided between the catalyst outer tube 18b and the lower plate member 18f. Thus, the reformed gas, which has passed through the catalyst layer 18d, flows through the gap and is folded back thereby. As a result, the reformed gas flows toward the exhaust outlet 18e disposed in an upper position.

In the burner 20, the air introduced from an air inlet 26 and a fuel offgas introduced from a fuel inlet 28 are mixed together so as to be combusted. A raw fuel gas may be supplied directly to the burner, depending on circumstances. The combustion of the fuel offgas by the burner 20 produces the high-temperature combustion exhaust gas of 1200 to 1300° C. The burner 20 is placed under a combustion chamber 30, which is cylindrical in shape and formed in the center of the reforming inner tube 18c, and the burner 20 is fixed to a lower part of the outer casing 22. As a result, the heat of the combustion exhaust gas produced in the burner 20 can be immediately used for the reforming reaction in the reformer 12. Thus the thermal efficiency can be enhanced.

To heat the reforming reaction tube 18, a heated flow passage 32 through which the aforementioned combustion gas passes is formed between the reforming reaction tube 18 and the outer casing 22.

As shown in FIG. 2, the raw fuel gas is supplied from above the reforming reaction tube 18, is then dispersed outward on an upper plate 18g of the reforming inner tube 18c, and is then supplied to the catalyst layer 18d. In this case, the raw fuel gas is heated by the combustion gas so as to raise the temperature. If the layout of passage through which each gas flows is devised, a raw fuel can be heated by the fuel exhaust gas flowing through the heated flow passage 32 or reformed gas inside the reforming reaction tube 18.

The steam required for the reforming reaction in the reformer 12 is obtained when the reforming water supplied from outside the fuel cell reforming apparatus 10 is evaporated by a steam supply means 100 (described later) having a plurality of heat exchangers. To deliver the water to the fuel cell reforming apparatus 10 from the exterior, a pump 36 for delivering the water by pressure is used, for instance. The reforming water is evaporated as described above and is sent to the reformer 12 as steam via a steam supply passage. At this time, the steam is mixed with the raw fuel gas by a mixer 34 provided above the reformer 12, and is then sent to the reformer 12.

As a modification of the fuel cell reforming apparatus according to the present embodiment, the raw fuel and the steam may join together in the mixer 34 after the temperature of the raw fuel has risen and also water has been evaporated by heat of the combustion exhaust gas; note that the heating of raw fuel and the evaporation of water are done separately from each other. This can easily control the supply of steam as a result of the temperature rise of the raw fuel gas or the evaporation of water in each supply passage.

The shift reactor 14, which is formed annular in shape, includes a catalyst layer comprised of pellets made of copper oxide or zinc oxide, for instance. The shift reactor 14 can reduce the carbon monoxide by a shift reaction, using the steam contained in the reformed gas, due to the activity of the catalyst layer.

The preferential oxidation unit 16 includes a catalyst layer, comprised of carbon monoxide preferential oxidation catalyst, supported on alumina, for instance. In the preferential oxidation unit 16, the carbon monoxide is combined with oxygen and converted into carbon dioxide through the activity of the catalyst layer and therefore the concentration of carbon monoxide is further reduced.

In a piping between the shift reactor 14 and the preferential oxidation unit 16 there is disposed an air supply passage 54 that communicates with the exterior of the fuel cell reforming apparatus 10 to supply the oxygen to be consumed in the preferential oxidation unit 16.

Hydrogen, as a reformed gas, whose carbon monoxide concentration has been sufficiently reduced in the preferential oxidation unit 16 is sent out to a fuel electrode 202 of a fuel cell 200. The fuel cell 200 generates power through an electrochemical reaction, in the electrolyte membrane 206, between hydrogen supplied to the fuel electrode 202 and oxygen supplied to the air electrode 204. Part of hydrogen that has not contributed to the reaction in the fuel electrode 202 is supplied to the burner 20 as a fuel offgas via the fuel inlet 28.

The steam supply means 100 vaporizes water, delivered by the pump 36, by heat exchange and then supplies it as steam to the reformer 12. The steam supply means 100 has heat exchangers 102, 104, 106 and 108. The heat exchanger 102 carries out heat exchange between the reformed gas flowing to the preferential oxidation unit 16 from the shift reactor 14 and the reforming water delivered from the pump 36. This heats the reforming water and at the same time cools the reformed gas.

The heat exchanger 104 is constituted by a coil-shaped pipe. The heat exchanger 104 conducts heat exchange between the reforming water heated by the heat exchanger 102 and the reformed gas delivered from the shift reactor 14. As a result, the reforming water is further heated and the reformed gas is cooled.

The heat exchanger 106 is constituted by a coil-shaped pipe disposed between the reforming reaction tube 18 and the outer casing 22. The heat exchanger 106 conducts heat exchange between the reforming water heated by the heat exchanger 104 and the combustion exhaust gas generated by the burner 20. As a result, the reforming water is further heated and the combustion exhaust gas is cooled.

The passage of the heat exchanger 108 is configured such that a plurality of tubular members are stacked together concentrically, and the heat exchanger 108 is arranged in an upper-part position of the reforming reaction tube 18. The heat exchanger 108 conducts heat exchange between the reforming water heated by the heat exchanger 106 and the reformed gas delivered from the reformer 12. As a result, the reforming water is further heated and is sent out as steam.

An operation of the fuel cell reforming apparatus 10 according to the present embodiment is now described. As shown in FIG. 2, after the combustion gas produced in the burner 20 heats up the underside of the upper plate 18g, the combustion gas heats up the reforming inner tube 18c from thereinside while descending along an inner wall of the reforming inner tube 18c. At this time, the catalyst layer 18d of the reformer 12 is heated to a temperature range of 600 to 700° C., for instance, required for the reforming reaction. Also, as shown in FIG. 1, the reforming water that passes through the steam supply means 100 is heated by the reformed gas or combustion exhaust gas in the heat exchangers 102, 104, 106 and 108, respectively, so as to be evaporated. On the other hand, the combustion exhaust gas rises up the heated flow passage 32 and is cooled by the heat exchanger 108, so that the temperature thereof drops gradually. It is to be noted here that the combustion exhaust gas having passed through the heated flow passage 32 is discharged to the exterior through the exhaust outlet 62 provided on top of the outer casing 22.

The steam evaporated in the steam supply means 100 and the raw fuel gas heated in the heat exchanger 108 are mixed in the mixer 34 and then sent from the mixer 34 downward along the reformer 12. The raw fuel gas containing steam is gradually heated by the heat of the combustion gas when passing through inside the catalyst layer 18d of the reformer 12, and is changed into a hydrogen-rich reformed gas through a reforming reaction.

The reformed gas produced by reforming the raw fuel gas rises up in the reforming outer tube 18a with the flow of the raw fuel gas supplied, and reaches the shift reactor 14 after conducting heat exchange with the heat exchanger 108 of FIG. 1. The shift reaction in the shift reactor 14 is carried out in the range of 200 to 300° C., for instance, and the heat balance is achieved by the heat recovery in the heat exchanger 108. In the present embodiment, the thickness of the heat insulating material 24 is determined so that the temperature of the shift reactor 14 falls within an appropriate temperature range. As a result, the carbon monoxide in the reformed gas is reduced in the shift reactor 14.

The reformed gas whose carbon monoxide has been reduced in the shift reactor 14 now reaches the preferential oxidation unit 16 with the flow of the raw fuel gas supplied. At this time, the air supplied from the air supply passage 54 also reaches the preferential oxidation unit 16.

The reformed gas that reaches the preferential oxidation unit 16 is cooled by the heat exchange conducted with the reforming water in the heat exchanger 104 and the heat exchanger 102, so that the temperature thereof is lower than that of the reformed gas in the shift reactor 14. The preferential oxidation reaction in the preferential oxidation unit 16 is carried out in the range of 70 to 200° C., for instance, which are lower than in the shift reaction in the shift reactor 14. In order to maintain an appropriate catalyst temperature, the heat balance is achieved by the heat recovery in the heat exchanger 104 and the heat exchanger 102. As a result, the carbon monoxide in the reformed gas is further reduced in the preferential oxidation unit 16.

As described above, in the fuel cell reforming apparatus 10 according to the present embodiment, steam is obtained in a manner that a plurality of heat exchangers conduct heat with the combustion exhaust gas and/or the reformed gas. When water is evaporated and becomes steam, nucleate boiling occurs irregularly and the volume thereof expands rapidly, so that vibration is likely to occur in positions where steam is generated. For example, vibration is likely to occur in a region where a slug flow occurs due to nucleate boiling and in a vicinity of a region, which is so-called a "dried-out region", where water is completely evaporated.

Thus, the steam supply means 100 according to the present embodiment is configured so that the occurrence of such vibration can be suppressed and the transfer of vibration to upstream and downstream sides can be suppressed. More specifically, the heat exchanger 108 according to the present embodiment dries out the reforming water by conducting heat exchange with the reformed gas. Also, the cross-sectional area of passage in the heat exchanger 108 is larger than that of a pipe connected upstream of the heat exchanger 108. Also, the heat exchanger 108 is comprised of tubular members whose diameter is larger than that of pipes connected thereto.

Setting the cross-sectional area of a tubular member in the heat exchanger 108 larger than that of an upstream-side pipe suppresses the occurrence of the slug flow in the heat exchanger 108 and reduces the flow rate. As a result, the pressure fluctuation is suppressed. If the heat exchanger 108 also serves as a pressure buffering mechanism for buffering and relieving the pressure fluctuation, the configuration will be made simpler as compared with a case where a heat exchanger and a pressure mechanism are otherwise provided separately. Note that the heat exchanger 108 is not limited to one that always conducts heat exchange with the reformed gas; if the layout of passage is devised, an arrangement may be such that the heat exchanger 108 conducts heat exchange with the combustion exhaust gas.

The steam supply means 100 includes the heat exchanger 106 for raising the evaporation rate of the reforming water up to a condition of gas-liquid multiphase by conducting heat exchange wherein the heat exchanger 106 is disposed upstream of the heat exchanger 108. Accordingly, the reforming water, in which the evaporation rate is raised by the heat exchanger 106, is supplied to the heat exchanger 108 wherein the reforming water is in a gas-liquid multiphase condition where a gas phase and a liquid phase are mixed together. More specifically, the reforming water is in the range of 100 to 125° C. Hence, the abrupt occurrence of steam is suppressed and the pressure fluctuation is suppressed, as compared with a case where the low-temperature reforming water, whose evaporation rate is low, is supplied to the heat exchanger 108.

The steam supply means 100 has the heat exchanger 104 disposed between the heat exchanger 106 and the pump 36. Here, the diameter of passage in the heat exchanger 104 is smaller than the diameter of passage in the heat exchanger 106. Thus, the heat exchanger 104 also functions as an upstream-side narrow-down mechanism of the steam supply means 100. As a result, an adverse effect of the pressure fluctuation on the pressure delivered from the pump 36 is suppressed in the event that a pressure fluctuates due to vaporization of water in the heat exchanger 108 and the heat exchanger 106, for instance.

Also, the heat exchanger 104 is configured so that the nucleate boiling of water starts by conducting heat exchange with the reformed gas. In other words, no nucleate boiling of water starts before the reforming water enters the heat exchanger 104. More specifically, the structure of the heat exchanger 102 may be adjusted in such a manner that the evaporation rate of reforming water flowing into the heat exchanger 104 is preferably 5% or below and the temperature thereof is more preferably 100° C. or below. As a result, no nucleate boiling occurs in an upstream side of the heat exchanger 104 that functions as the narrow-down mechanism, and the transfer of vibration to an upstream side can be suppressed even though a slug flow occurs due to nucleate boiling in the heat changer 104 and in a downstream side of the heat exchanger 104. Note that the heat exchanger 104 is not limited to one that always conducts heat exchange with the reformed gas; if the layout of passage is devised, an arrangement may be such that the heat exchanger 104 conducts heat exchange with the combustion exhaust gas or catalyst-filled layer.

Also, the cross-sectional area S1 of the heat exchanger 108, the cross-sectional area S2 of the heat exchanger 106 and the cross-sectional area S3 of the heat exchanger 104 are related to one another such that S1>S2>S3. Thus, the transfer of vibration to an upstream side is suppressed in the event that vibration is caused in each heat exchanger. Also, the volume V1 of a region involving a heat exchange process in the heat exchanger 108, the volume V2 of a region involving a heat exchange process in the heat exchanger 106 and the volume V3 of a region involving a heat exchange process in the heat exchanger 104 are related to one another such that V1>V2>V3. Thus, the reforming water can be reliably dried out in the heat exchanger 108 whose volume is larger. The occurrence of vibration can be mitigated even in the event that a bumping occurs, for instance.

As described above, the fuel cell reforming apparatus 10 is configured so that the occurrence of vibration caused by the generation of steam is suppressed and the transfer of vibration to an upstream side is suppressed. This prevents the supply pressure of the pump 36 from being unstable, so that steam can be stably generated and consequently the reformed gas can be stably generated.

(Second Embodiment)

A second embodiment differs substantially from the first embodiment in that a downstream-side narrow-down mechanism is provided between a raw fuel supply passage 40 and the heat exchanger 108 in the steam supply means 100 shown in FIG. 1 and also the downstream-side narrow-down mechanism has a diameter smaller than that of any of the heat exchangers. Here, the raw fuel supply passage 40, which is disposed downstream of the heat exchanger 108, supplies a raw fuel to the reformer 12.

Figure 3A:
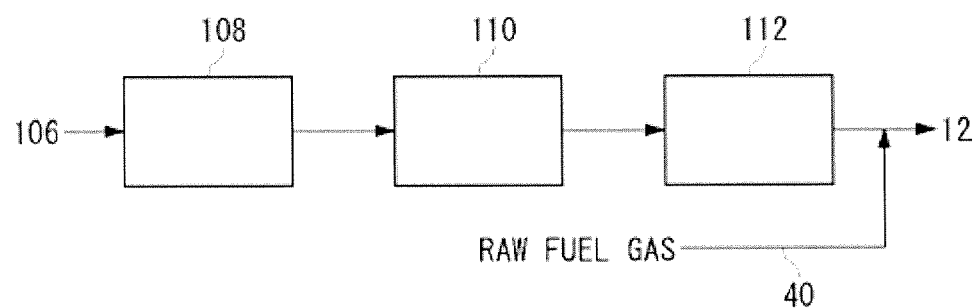
FIGS. 3A and 3B are illustrations of a schematic configuration of constituent components disposed in an area covering a heat exchanger to a reformer.
Figure 3B:
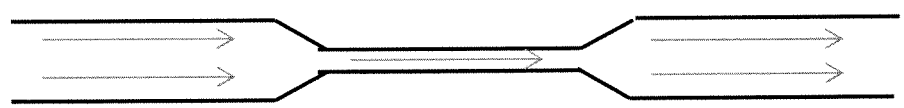

FIG. 3A is an illustration of a schematic configuration of constituent components disposed in a area covering the heat exchanger 108 to the reformer 12. As shown in FIG. 3A, a mist trap 110 is located downstream of the heat exchanger 108, and a capillary 112, namely the downstream-side narrow-down mechanism, as shown in FIG. 3B, is connected between the raw fuel supply passage 40, disposed downstream of the heat exchanger 108, for supplying a raw fuel to the reformer 12 and the heat exchanger 108. The capillary 112 has a diameter smaller than that of passage in at least the heat exchanger 108. Thus, even if a bumping occurs in the heat exchanger 108, an adverse effect of the pressure fluctuation caused thereby on the raw-fuel pressure in the downstream-side raw fuel passage 40 is suppressed. As a result, the raw fuel can be stably supplied and the reformed gas can be stably generated.

Figure 4:
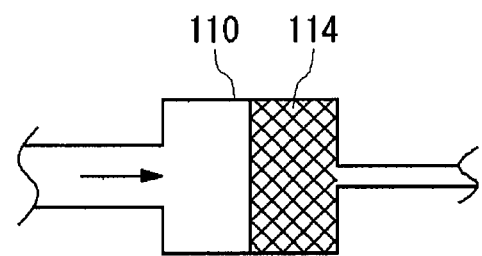
FIG. 4 is a schematic cross-sectional view of a mist trap.

The mist trap 110 for trapping a foreign matter to prevent it from flowing into a downstream side is connected between the heat exchanger 108 and the capillary 112. FIG. 4 is a schematic cross-sectional view of the mist trap. The mist trap 110 is provided with a mesh 114 therewithin. For example, if a foreign matter such as silica contained in water precipitates and falls away from a wall surface of piping, the mist trap 110 can capture it. This prevents the foreign matter from being clogged up in the downstream-side capillary 112, so that steam can be stably supplied to the reformer 12. Also, the load to the pump, which supplies water by pressure, can be reduced. A material where the mesh size is "60 mesh" and the density is 230 kg/m3 is used for the mesh 114 according to the present embodiment.

By employing the above-described fuel cell reforming apparatus according to each of the embodiments, the occurrence of vibration caused by the generation of steam is suppressed and the transfer of vibration is suppressed. As a result, the range of variation in the raw fuel supply pressure and reforming water supply pressure and the pressure itself are reduced.

Also, even though water in liquid phase stays on in the heat exchanger 108 at a power-on for example, the water is vaporized by the reformed gas and therefore steam can be generated efficiently at a power-on.

COMPARATIVE EXAMPLE

Figure 5:
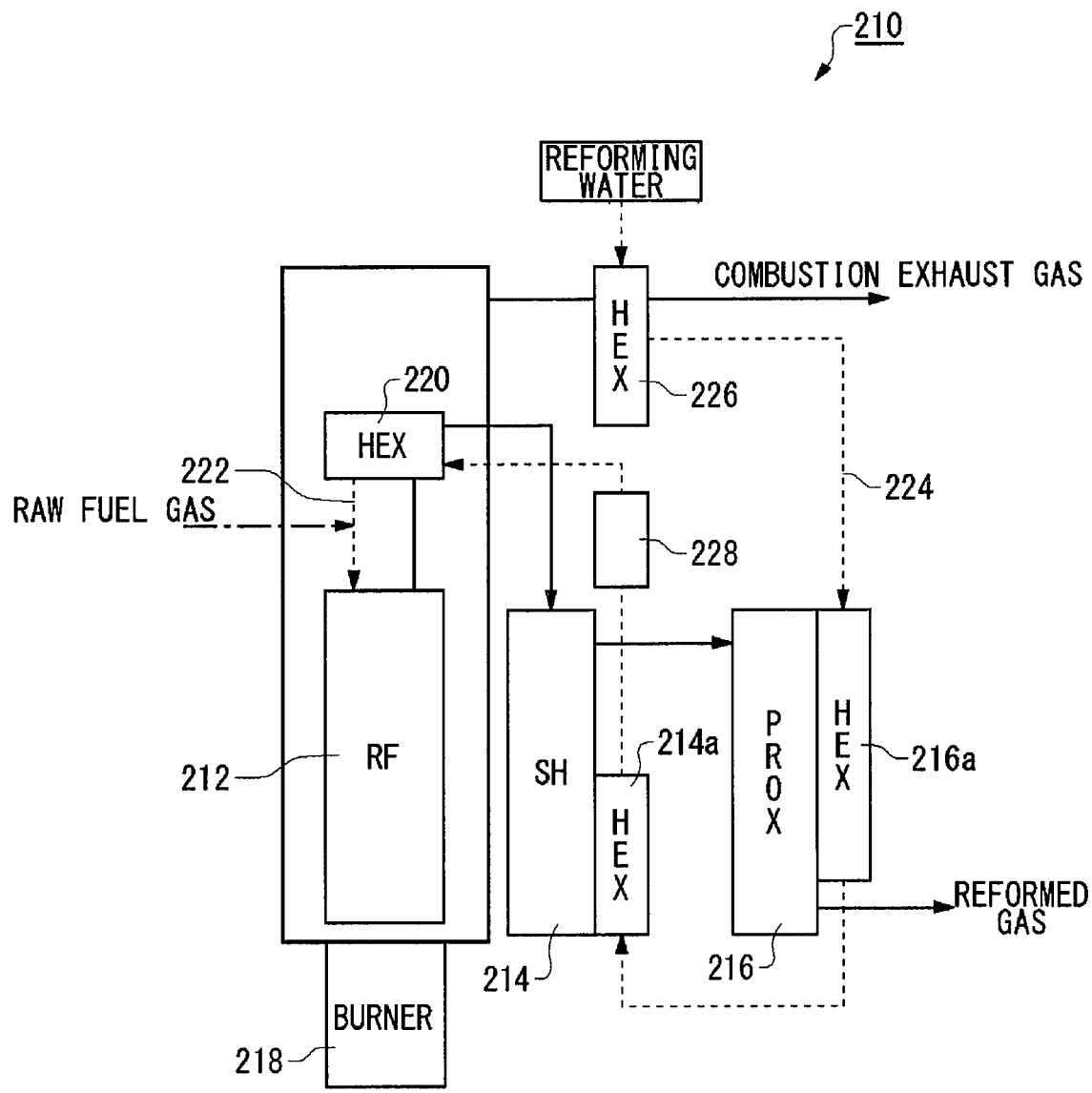
FIG. 5 schematically illustrates a structure of a reforming apparatus, for use in a fuel cell, according to a comparative example.

FIG. 5 schematically illustrates a structure of a fuel cell reforming apparatus 210 according to a comparative example. The fuel cell reforming apparatus 210 includes a reformer 212 for producing the reformed gas from the raw fuel, a shift reactor 214 for reducing the carbon monoxide contained in the reformed gas through a shift reaction, and a preferential oxidation unit 216 for reducing the carbon monoxide contained in the reformed gas which has passed through the shift reactor 214 by performing preferential oxidation on said carbon monoxide through a preferential oxidation reaction. A burner 218 is installed below the reformer 212. A reforming catalyst stored in the reformer 212 is heated by the combustion of the burner 218 and is kept at a predetermined catalyst reaction temperature (e.g., 600-700° C.)

A steam generator 220 is arranged above the reformer 212. The steam generator 220 is configured so that the reforming water can be dried out. Steam produced in the steam generator 220 passes through a steam supply passage 222 and is supplied to an inlet side of the reformer 212. At this time, hydrocarbon-based raw fuel gas is mixed midway along the steam supply passage 222. Thereby, a mixed gas of steam and raw fuel gas is supplied to the reformer 212. The mixed gas is supplied after the temperature of reforming catalyst has risen to the catalyst reaction temperature.

While passing through a reforming catalyst layer placed inside the reformer 212, the mixed gas supplied to the reformer 212 undergoes steam reforming so as to become a reformed gas principally made of hydrogen. Then the reformed gas is discharged from an outlet side of the reformer 212 and is introduced to an inlet side of the shift reactor 214 via the steam generator 220. In this case, the high-temperature reformed gas is subjected to heat exchange with water supplied to the steam generator 220 when passing through within the steam generator 220.

While passing through a shift reaction catalyst layer placed inside the shift reactor 214, the reformed gas introduced into the shift reactor 214 undergoes shift reaction and reduces its CO concentration. The reformed gas is discharged from an outlet side of the shift reactor 214 and is introduced into an inlet side of the preferential oxidation unit 216. While passing through an oxidation catalyst placed inside the preferential oxidation unit 216, the converted reformed gas introduced into the preferential oxidation unit 216 undergoes preferential oxidation and the CO concentration of the converted reformed gas is reduced to about 10 ppm. And the converted reformed gas is discharged from an outlet side of the preferential oxidation unit 216 and is supplied to the fuel electrode of the fuel cell (not shown).

A feed-water passage 224 is provided to feed water to the steam generator 220. The feed-water passage 224 is formed as a feed-water preheat line that gradually raises the temperature of cold water by having the water pass through a heat exchanger 226, a heat exchanger 216a of the preferential oxidation unit 216 and a heat exchanger 214a of the shift reactor 214, in this order, along the feed-water passage 224.

The aforementioned heat exchanger 226 is configured so that the combustion exhaust gas produced by the combustion of the burner 218 can pass. The heat exchanger 226 conducts heat exchange between the combustion exhaust gas and the cold water supplied to the feed-water passage 224. Thus, the combustion exhaust gas can be efficiently utilized. When passing through the preferential oxidation unit 216, the water heated after passing through the heat exchanger 226 undergoes heat exchange with the oxidation catalyst placed inside the preferential oxidation unit 216. The catalyst reaction temperature of oxidation catalyst is 100 to 180° C., for instance. The catalyst reaction is an exothermic reaction, so that the oxidation catalyst must be cooled and the catalyst reaction temperature must be maintained during power generation of the fuel cell. Water in the feed-water passage 224 is used as a cold source and the temperature of the water used for the cooling rises due to the heat exchange.

When passing through the shift reactor 214, the water whose temperature has risen in the preferential oxidation unit 216 undergoes heat exchanges with a shift reaction catalyst placed inside the shift reactor 214. The catalyst reaction temperature of shift reaction catalyst is 180 to 250° C., for instance. This catalyst reaction is an exothermic reaction, too, so that the shift reaction catalyst must be cooled and the catalyst reaction temperature must be maintained during power generation of the fuel cell. Water in the feed-water passage 224 is used as a cold source and the temperature of the water used for the cooling rises due to the heat exchange.

In this manner, the cold water supplied to the feed-water passage 224 is preheated gradually through three stages as it travels to the steam generator 220 where it is introduced into the steam generator 220. In this case, if the temperature of water exceeds 100° C. by the preheating along the feed-water passage 224, water will partially boil and therefore the flow of water will be disturbed because a pressure fluctuation occurs within the feed-water passage 224.

Accordingly, a buffer means 228 is provided in an inlet side of the steam generator 220 in the feed-water passage 224. The buffer means 228 may be a tank having a buffering function, for instance.

In the fuel cell reforming apparatus 210 of comparative example configured as above, the reforming water is preheated when it passes through the heat exchanger 226, the heat exchanger 216a of the preferential oxidation unit 216 and the heat exchanger 214a of the shift reactor 214 in the feed-water passage 224. The reforming water further passes through the buffer means 228 and flows into the steam generator 220. The water flowing into the steam generator 220 is in a gas-liquid mixed phase of close to 100° C., so that the water is evaporated in a short period of time and is supplied to the steam supply passage 222. Then, as described above, the raw fuel gas is supplied and mixed midway along the steam supply passage 222, so that the steam and the raw fuel gas, which are now mixed together, are supplied to the inlet side of the reformer 212.

As steam is produced in the steam generator 220, the pressure fluctuates. The pressure variation causes a pulsating movement within the feed-water passage 224, thereby changing the quantity of supply water flowing into the steam generator 220. In this comparative example, the buffer means 228 is provided in the inlet side of the steam generator 220, so that the pulsating energy can be absorbed by the buffering mechanism in the buffer means 228. However, since in this comparative example the buffer means 228 must be provided separately from the steam generator 220, the structure in this comparative example gets complicated.

In contrast thereto, in the fuel cell reforming apparatus according to each of the above-described embodiments, the cross-sectional area of passage in the heat exchanger 108 that functions as a dry-out heat exchanger is larger than that of a pipe connected upstream of (in an inlet side of) the heat exchanger 108. As a result, the vibration caused by evaporation can be suppressed by the heat exchanger 108 itself. Thus, the buffer means otherwise required in the comparative example can be eliminated, so that the cost can be reduced and the overall size of the apparatus can be made smaller.

The present invention has been described by referring to each of the above-described embodiments. However, the present invention is not limited to the above-described embodiments only, and those resulting from any combination of them or substitution as appropriate are also within the scope of the present invention. Also, it is understood that various modifications such as changes in design may be made based on the knowledge of those skilled in the art, and the embodiments added with such modifications are also within the scope of the present invention.

To promote the heat transfer on a gas side in a heat exchanger between gas and water, the above-described fuel cell reforming apparatuses may fill a gas-side passage with a material, which enhances the heat conductivity, by spreading alumina balls, MacMahon packing or the like on the gas-side passage.

The raw fuel used for the above-described fuel cell reforming apparatuses is not limited to methane, propane, butane or the like exemplified in the above embodiments. For example, hydrocarbons such as natural gas, LPG mainly composed of propane and butane, naphtha, or kerosene, alcohols such as methanol or ethanol, ethers such as dimethyl ether, and so forth may be used as the raw fuel.

The above-described fuel cell reforming apparatus is provided with the shift reactor 14 and the preferential oxidation unit 16 that function as a carbon monoxide reducing means. However, as long as the concentration of carbon monoxide can be reduced, by the shift reactor 14 alone, to such a range that it is practically acceptable, the preferential oxidation unit 16 may not be provided at all.

What is claimed is:

1. A reforming apparatus for reforming a raw fuel into a hydrogen-rich reformed gas, the reforming apparatus comprising:

a reformer configured to generate the reformed gas from the raw fuel; and a steam supply means configured to supply steam to said reformer, wherein said steam supply means includes:

at least first and second gas-liquid multiphase heat exchangers for conducting in turn heat exchange with at least one of a combustion exhaust gas and the reformed gas to raise an evaporation rate of water up to a condition of gas-liquid multiphase, the combustion exhaust gas being generated when said reformer is heated, a pipe configured to connect the at least first and second gas-liquid multiphase heat exchangers in series and allow passage of steam or water in a gas-liquid mixed phase that is supplied to the reformer, a dry-out heat exchanger disposed to receive the gas-liquid multiphase water from the series-connected first and second gas-liquid multiphase heat exchangers to dry out the water by conducting heat exchange with at least one of the combustion exhaust gas and the reformed gas, an upstream-side narrow-down mechanism located between a water supply means for supplying water by pressure toward the first gas-liquid multiphase heat exchanger and the second gas-liquid multiphase heat exchanger, the upstream-side narrow-down mechanism having a diameter smaller than that of a passage of the second gas-liquid multiphase heat exchanger, and the cross-sectional area of a passage in the dry-out heat exchanger is larger than that of a pipe connected between the dry-out heat exchanger and the series-connected first and second gas-liquid multiphase heat exchangers.

2. The reforming apparatus, according to claim 1, wherein no nucleate boiling of water by heat exchange occurs in an upstream side of the upstream-side narrow-down mechanism.

3. The reforming apparatus according to claim 1, wherein said steam supply means has a downstream-side narrow-down mechanism located between a raw fuel supply passage, for supplying a raw fuel to said reformer, and the dry-out heat exchanger, the downstream-side narrow-down mechanism having a diameter smaller than that of the passage of the dry-out heat exchanger.

4. The reforming apparatus according to claim 3, further comprising a foreign-matter capturing means configured to prevent a foreign matter from flowing into a downstream side, the foreign-matter capturing means being disposed between the dry-out heat exchanger and the downstream-side narrow-down mechanism.

* * * * *